Oct. 13, 1925.    1,556,955
A. J. REBSTOCK
CONVEYER
Filed Aug. 23, 1923

Inventor
August Joseph Rebstock
By Alfred R. Fuchs Atty.

Patented Oct. 13, 1925.

1,556,955

UNITED STATES PATENT OFFICE.

AUGUST JOSEPH REBSTOCK, OF ST. LOUIS, MISSOURI, ASSIGNOR TO THE REBSTOCK COMPANY, OF ST. LOUIS, MISSOURI, A CORPORATION OF MISSOURI.

CONVEYER.

Application filed August 23, 1923. Serial No. 658,957.

*To all whom it may concern:*

Be it known that I, AUGUST JOSEPH REBSTOCK, a citizen of the United States, residing at St. Louis, in the State of Missouri, have invented new and useful Improvements in Conveyers, of which the following is a specification.

My invention relates to conveyers and more particularly to a bearing for roller conveyers.

It is the purpose of my invention to provide a simple and efficient bearing for conveyers of the roller type comprising a bearing member of anti-friction material such as brass which is so mounted as to be easily put in place and removed and which is so constructed that bearings for a plurality of rollers can be mounted simultaneously on a side member of the conveyer having said rollers.

It is another object of the invention to provide a conveyer bearing which can be easily lubricated. This is particularly desirable when the conveyer is used in dairies, where the conveyers are cleaned daily by means of a steam blast, and accordingly the conveyers require daily lubrication. This can be easily done with an oil can with the bearings shown, requiring only a few minutes' time.

Particularly my invention comprises a pair of side members through which the shafts or pins on the ends of the rollers project, said members having openings therein of such a size that the shaft like members on the ends of the rollers have play in said openings and bearing members of brass or similar anti-friction material detachably mounted on said side members, said bearing members each comprising a plurality of bearing portions for a plurality of rollers. If desired the bearing members can be provided with an adjustable connection between themselves and the conveyer side members to provide a take up device to take up any wear in said bearings.

Other objects and advantages of the invention will appear as the description of the accompanying drawings proceeds. However, I desire to have it distinctly understood that I do not intend to limit myself to the exact details shown or described but that I intend to include as part of my invention all such obvious changes and modifications of parts as would occur to a person skilled in this art and as would fall within the scope of the claims.

Figure 1:
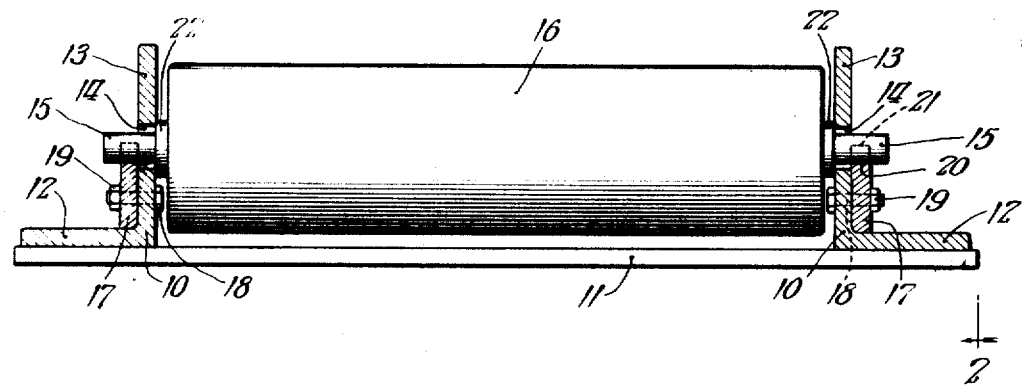
Figure 2:
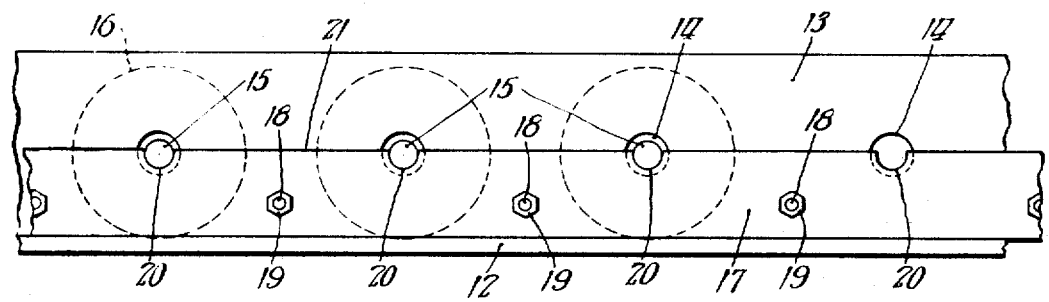
Figure 3:
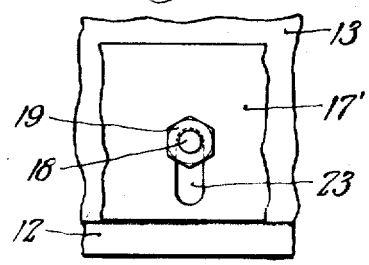

In the drawings Figure 1 is a transverse sectional view of a roller conveyer embodying my invention;

Figure 2 is a fragmentary side elevation of the conveyer shown in Figure 1 as viewed from the line 2—2 of Figure 1; and Figure 3 is a fragmentary side elevation showing adjusting slots.

Referring in detail to the drawings, my improved conveyer construction comprises a pair of angular side members 10 which are connected at intervals by means of the cross members 11 secured in any suitable manner to the horizontally extending legs 12 of said side members 10. Said side members 10 are also provided with upwardly or vertically extending leg portions 13 which are provided with openings 14 through which the shafts or spindles 15 provided on the ends of the rollers 16 extend. The shaft portions 15 may be mounted in any suitable manner on the rollers 16 and are of such a diameter relative to the openings 14 that there is a small space provided between the outer surfaces of said shaft portions 15 and the inner faces of the opening 14.

Brass strips 17 or strips of other material producing an anti-friction bearing with the iron or steel shaft portions 15 are secured against the outer faces of the upstanding or vertical leg portions 13 of the member 10, said members being detachably mounted in position and being secured by means of bolts 18 and nuts 19 or by any other detachable securing means. The strips 17 are made of comparatively thin material and are provided with grooves or recesses 20 in the upper edge 21 thereof, said grooves or recesses being substantially semicircular and being of a diameter so as to properly fit the shaft portions 15 to form a bearing therefor. The grooves or recesses 20 are so spaced relative to the openings 14 as to hold the shaft portions 15 out of engagement with the lower portions of the walls of said openings 14. Thus the brass or other anti-friction material 17 will serve as a bearing surface for the rollers and there will be no engagement between the rollers or the shafts and the members 10 except where the collars 22 engage with the inner faces of the members 10 to take up side thrust.

It will accordingly be seen that since the rollers 16 are always so positioned that the weight of the material or containers passing over the same is always downward all of the friction produced due to the weight of the material passing over the rollers is taken up by the brass or other anti-friction material bearing members whereas the fact that the shafts 15 extend through the openings 14 in the members 10 prevent the shafts from riding upwardly out of the grooves or recesses in said brass bearing members.

It will be further noted that by providing a bearing of this character in a conveyer of the roller type having long runs with a large number of parallel rollers mounted between parallel side members a very cheap and quickly installed anti-friction bearing is provided by the use of the elongated anti-friction metal strips detachably mounted on the side members of the conveyer and that the shaft ends can be easily lubricated from above with an ordinary oil can. It is of course to be understood that the anti-friction metal strips may be applied to roller or similar rotating members having shafts arranged in rows no matter what the position thereof nor the direction of extent thereof as the device can be obviously modified slightly to take care of various conditions without departing from the spirit of the invention.

If desired, the bearing strips can be adjustably mounted on the side members 10. Such a construction is shown in Figure 3 in which the bearing strip 17' is shown as having slots 23 therein through which the bolts 18 extend. Otherwise the device is the same as shown in Figures 1 and 2. It will be evident that the bearing shown in Figure 3 can be adjusted by means of the bolt and slot connection to take up any wear that will occur in the bearing portion 20, as substantially all the wear takes place in the bottoms of said openings 20.

Having thus described my invention what I desire to claim and secure by U. S. Letters Patent is:

1. In a device of the character described, a plurality of members having shaft-like portions projecting axially therefrom and means for supporting said members for rotation, comprising a pair of side members having openings therein for loosely receiving said shaft-like portions, and members each having bearing portions therein for receiving a plurality of said shaft-like portions, said shaft-like portions being journalled solely in said bearing portions.

2. In a device of the character described, a plurality of members having shaft-like portions projecting axially therefrom and means for supporting said members for rotations, said shaft-like portions being journalled solely in said bearing portions.

ceiving said shaft-like portions, and strips of anti-friction material each having bearing portions therein for receiving a plurality of said shaft-like portions.

3. In a device of the character described, a plurality of members having shaft-like portions projecting axially therefrom, and means for supporting said members for rotation, comprising a pair of side members having openings therein loosely receiving said shaft-like portions and bearing strips on said side members each having a plurality of upwardly opening bearing portions for said shaft-like portions.

4. In a device of the character described, a plurality of members having shaft-like portions projecting axially therefrom, and means for supporting said members for rotation, comprising a pair of side members having openings therein loosely receiving said shaft-like portions and bearing strips of anti-friction material on said side members each having a plurality of bearing portions accurately fitting said shaft-like portions.

5. In a conveyer, a pair of angular side members, rollers having shaft portions projecting edgewise therebeyond, said side members having openings in one leg thereof therein loosely receiving said shaft portions, and bearing strips of anti-friction material having spaced bearings in the edge thereof for said shaft portions.

6. In a conveyer, a pair of side members, rollers having shaft portions projecting endwise therebeyond, said side members having openings therein loosely receiving shaft portions, bearing strips of anti-friction material having a plurality of spaced bearings therein for said shaft portions and means for detachably securing said strips to said side members, said shaft portions normally engaging only said bearing strips.

7. In a roller conveyer, a side member having openings therein, rollers having endwise projecting spindles fitting loosely in said openings and normally spaced from the walls of said openings, and a strip of anti-friction material mounted on said side member and having spaced bearings for said spindles therein.

8. In a roller conveyer, a side member having openings therein, rollers having endwise projecting spindles fitting loosely in said openings and normally spaced from the walls of said openings, and a strip of anti-friction material mounted on said side member, having recesses in the upper edge thereof, said recesses serving as bearings for said spindles.

9. In a roller conveyer, a side member having openings therein, rollers having endwise projecting spindles fitting loosely in said openings and normally spaced from the walls of said openings, and a strip of anti-friction material mounted on said side member outwardly thereof and having spaced bearings for said spindles therein.

10. In a roller conveyer, a side member having openings therein, rollers having endwise projecting spindles fitting loosely in said openings and normally spaced from the walls of said openings, and a strip of anti-friction material mounted on said side member having spaced bearings for said spindles therein and means for detachably securing said strips to the outer side of said side member, said spindles normally engaging said bearings due to the action of gravity.

11. In a device of the character described, a plurality of members having shaft-like portions projecting axially therefrom and means for supporting said members for rotation, comprising a pair of side members having openings therein for loosely receiving said shaft-like portions, and members having bearing portions therein for receiving said shaft-like portions, adjustably mounted on said side members.

12. In a conveyer, a pair of side members, rollers having shaft portions projecting endwise therebeyond, said side members having openings therein loosely receiving said shaft portions, and bearing strips having spaced bearings therein for said shaft portions, adjustably mounted on said side members.

13. In a roller conveyer, a side member having openings therein, rollers having endwise projecting spindles fitting loosely in said openings, and a strip of anti-friction material mounted on said side member having spaced bearings for said spindles therein and means for detachably securing said strips to the outer side of said side member, said strips being adjustable on said side member.

14. In a device of the character described, a plurality of members having shaft-like portions projecting axially therefrom and means for supporting said members for rotation, comprising a pair of side members having openings therein for loosely receiving said shaftlike portions, and members having bearing portions therein for receiving said shaftlike portions shiftable bodily on said side members 15. In a device of the character described, a plurality of members having shaftlike portions projecting axially therefrom and means for supporting said members for rotation, comprising a pair of side members having openings therein for loosely receiving said shaftlike portions, and members having bearing portions therein for receiving said shaftlike portions, said members being provided with securing means comprising a pin and slot connection, whereby said strips are adjustable to compensate for wear of said bearings.

16. In a roller conveyer, rollers having endwise projecting spindles and means for supporting said rollers and journalling said spindles, comprising a framework, and a bearing member of anti-friction material journalling a plurality of said spindles mounted on said framework, said framework being provided with means normally out of engagement with said spindles for holding said spindles from riding out of said bearing member.

In testimony whereof I hereunto sign my name this 6th day of August, 1923.

AUGUST JOSEPH REBSTOCK.

anti-friction material mounted on said side member outwardly thereof and having spaced bearings for said spindles therein.

10. In a roller conveyer, a side member having openings therein, rollers having endwise projecting spindles fitting loosely in said openings and normally spaced from the walls of said openings, and a strip of anti-friction material mounted on said side member having spaced bearings for said spindles therein and means for detachably securing said strips to the outer side of said side member, said spindles normally engaging said bearings due to the action of gravity.

11. In a device of the character described, a plurality of members having shaft-like portions projecting axially therefrom and means for supporting said members for rotation, comprising a pair of side members having openings therein for loosely receiving said shaft-like portions, and members having bearing portions therein for receiving said shaft-like portions, adjustably mounted on said side members.

12. In a conveyer, a pair of side members, rollers having shaft portions projecting endwise therebeyond, said side members having openings therein loosely receiving said shaft portions, and bearing strips having spaced bearings therein for said shaft portions, adjustably mounted on said side members.

13. In a roller conveyer, a side member having openings therein, rollers having endwise projecting spindles fitting loosely in said openings, and a strip of anti-friction material mounted on said side member having spaced bearings for said spindles therein and means for detachably securing said strips to the outer side of said side member, said strips being adjustable on said side member.

14. In a device of the character described, a plurality of members having shaft-like portions projecting axially therefrom and means for supporting said members for rotation, comprising a pair of side members having openings therein for loosely receiving said shaftlike portions, and members having bearing portions therein for receiving said shaftlike portions shiftable bodily on said side members 15. In a device of the character described, a plurality of members having shaftlike portions projecting axially therefrom and means for supporting said members for rotation, comprising a pair of side members having openings therein for loosely receiving said shaftlike portions, and members having bearing portions therein for receiving said shaftlike portions, said members being provided with securing means comprising a pin and slot connection, whereby said strips are adjustable to compensate for wear of said bearings.

16. In a roller conveyer, rollers having endwise projecting spindles and means for supporting said rollers and journalling said spindles, comprising a framework, and a bearing member of anti-friction material journalling a plurality of said spindles mounted on said framework, said framework being provided with means normally out of engagement with said spindles for holding said spindles from riding out of said bearing member.

In testimony whereof I hereunto sign my name this 6th day of August, 1923.

AUGUST JOSEPH REBSTOCK.

---

Certificate of Correction.

It is hereby certified that in Letters Patent No. 1,556,955, granted October 13, 1925, upon the application of August Joseph Rebstock, of St. Louis, Missouri, for an improvement in "Conveyers," errors appear in the printed specification requiring correction as follows: Page 2, claim 2, strike out present lines 64 and 65 and insert instead the syllable, words, and syllable *tion, comprising a pair of angular side members having openings therein for loosely re-;* same page, line 93, claim 5, for the word "edgewise" read *endwise;* and that the said Letters Patent should be read with these corrections therein that the same may conform to the record of the case in the Patent Office.

Signed and sealed this 17th day of November, A. D. 1925.

[SEAL.]

WM. A. KINNAN,
*Acting Commissioner of Patents.*

Certificate of Correction.

It is hereby certified that in Letters Patent No. 1,556,955, granted October 13, 1925, upon the application of August Joseph Rebstock, of St. Louis, Missouri, for an improvement in "Conveyers," errors appear in the printed specification requiring correction as follows: Page 2, claim 2, strike out present lines 64 and 65 and insert instead the syllable, words, and syllable *tion, comprising a pair of angular side members having openings therein for loosely re-;* same page, line 93, claim 5, for the word "edgewise" read *endwise;* and that the said Letters Patent should be read with these corrections therein that the same may conform to the record of the case in the Patent Office.

Signed and sealed this 17th day of November, A. D. 1925.

[SEAL.]
WM. A. KINNAN,
*Acting Commissioner of Patents.*